Jan. 28, 1964  E. C. HELD, JR  3,119,216
HEAT SEALING OF THERMOPLASTIC CONTAINERS
Filed May 5, 1960
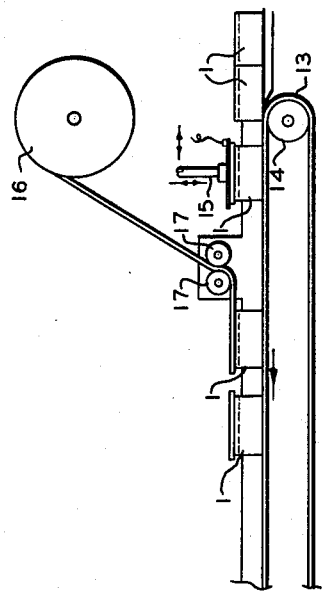
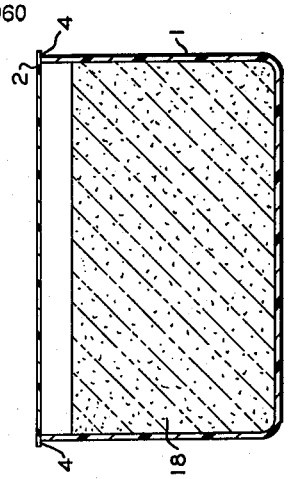
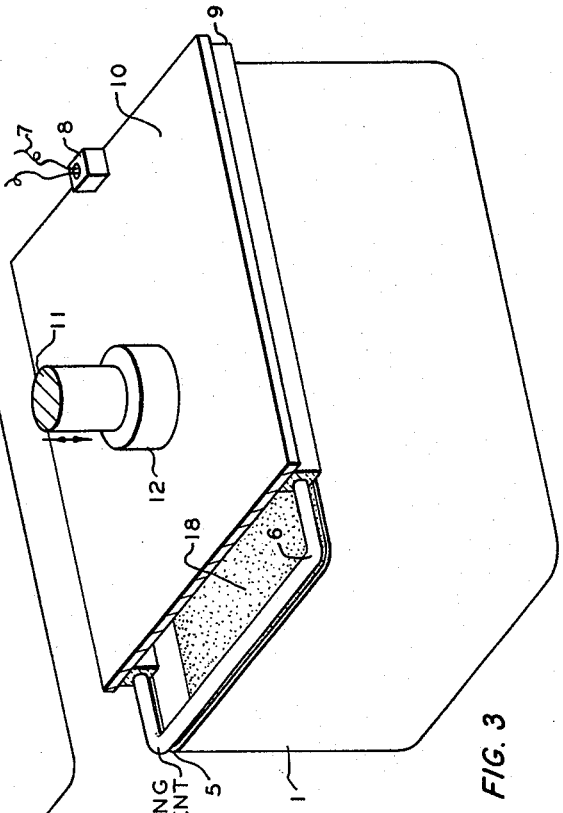
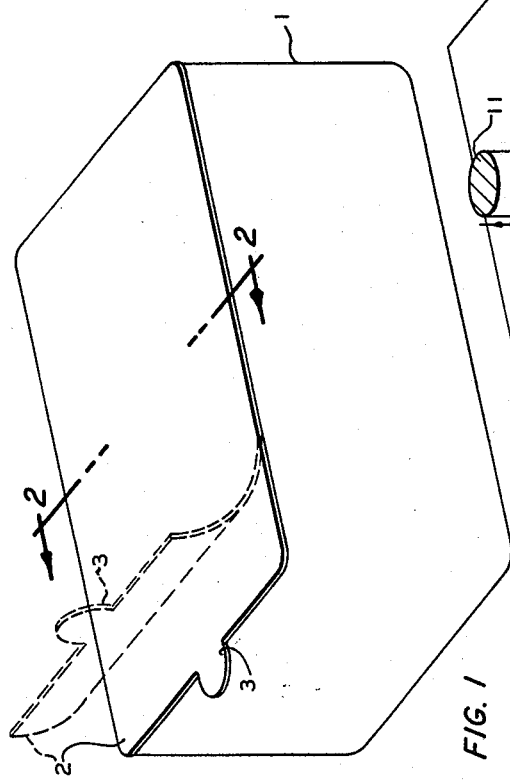
INVENTOR.
E.C. HELD, JR.
BY Hudson & Young
ATTORNEYS

3,119,216
HEAT SEALING OF THERMOPLASTIC CONTAINERS

Edward C. Held, Jr., Bartlesville, Okla., assignor to Phillips Petroleum Company, a corporation of Delaware
Filed May 5, 1960, Ser. No. 27,043
5 Claims. (Cl. 53—39)

This invention relates to the sealing of thermoplastic containers. In one aspect this invention relates to an improved method of sealing thermoplastic containers with a thermoplastic film. In another aspect the invention relates to an improved method of hermetically sealing polyethylene thermoformed packages with polyethylene film.

Thermoplastic containers have found many uses in the packaging industry including the packaging of food in which application the opening to the thermoplastic container is generally sealed by means of a thermoplastic sheet material which is fused directly to the thermoplastic container to form a hermetically sealed package. The thermoplastic sheet material's general impermeability to moisture transfer and transparency have proven to be valuable assets in the preservation of the freshness of the contents within the container and consumer acceptance. In addition, the sheet material can be fused with the thermoplastic container by the application of heat to become an integral part of the container; however, this ease of fusion of the film with the container has proven a detriment because the strong bond formed between the two component parts makes it difficult for the ultimate consumer to remove the thin sheet material so as to remove the contents. Efforts by fabricators to produce an efficient but easily removed seal have heretofore been unsuccessful.

It is an object of this invention to provide a method for sealing thermoplastic containers.

It is another object of this invention to provide an improved method of sealing thermoplastic containers with thermoplastic film.

Yet another object of this invention is to provide an improved method for hermetically sealing thermoplastic containers with thermoplastic sheet material so as to provide a weak bond between the film and the container thereby permitting easy removal of said film.

These and other objects and advantages of the invention will be apparent to those skilled in the art from a consideration of this disclosure and claims.

In one embodiment of the invention these objects are broadly accomplished by heating at least a portion of the surface of the thermoplastic container which will contact the film until said portion is melted, removing the source of heat, immediately engaging said surface with a thermoplastic film so as to enclose said opening thereby becoming an integral part of said container by fusing therewith and cooling said fused surfaces to cause solidification thereof.

In one aspect of the above embodiment the thermoplastic film is at a temperature above the ambient temperature but below the melting point of said film.

In a second embodiment of the invention the thermoplastic film is heated to a temperature above the melting point of said film and said container, the source of heat is removed and the molten web is immediately placed in intimate contact with the lip of the container so as to enclose the opening therein, said molten web containing sufficient heat to melt the surface of said lip and fuse therewith and cooling said fused surfaces to cause solidification thereof.

In one aspect of this second embodiment the thermoplastic film is engaged with the container as it emerges from the slot-die extruder at a temperature above the melting point of the material.

Cutouts may be provided in the flange of the container, or if the container contains no flange a small piece of surplusage material may be provided, so that a person's finger may more readily start the peeling action.

Although this specification will discuss thermoformed containers and thin sheets of film to seal said container, the invention is also applicable to other thermoplastic structures, e.g., drums, tubes, boxes, cylinders, which are sealed with another thermoplastic structure, e.g., film, lids, covers, etc.

Films of solid polymers of thermoplastic materials such as polyolefins have been prepared by several different methods and the manufacture of said films is not a part of this invention per se. Such methods include casting of films from a solution of the polymer in a suitable solvent, extrusion of the molten polymer through a small opening (known in the extrusion art as "slot-die extrusion") and also the blown-tube technique whereby a tube of the polymer is extruded and is thereafter expanded by applying pneumatic pressure to the interior of the tube so as to reduce the wall thickness of the tube to the desired size. The slot-die extrusion method has been utilized extensively for the production of thin films because of the close control of thickness which can be obtained. It has also been found advantageous to utilize the slot-die extrusion technique when it is necessary to produce a continuous length of film such as used for the covers of thermoformed containers for packaging of foods. Any of the conventional techniques for producing thin films of thermoplastic materials can be utilized in this invention.

The starting materials for the process of this invention can be characterized as thermoplastic materials. A highly satisfactory and often preferred starting material for both the thermoplastic film and the thermoformed container for use in the present invention can be obtained by the process set forth in Hogan and Banks Patent No. 2,825,-721, issued March 4, 1958. Polymers according to the cited application are produced by polymerizing a 1-olefin having a maximum chain length of 8 carbon atoms and no branching near the double bond in the 4 position by contacting said 1-olefin with a solid catalyst containing as an essential catalytic ingredient, chromium oxide, associated with at least one porous oxide selected from the group consisting of silica, alumina, zirconia and thoria. A polyethylene produced by the process of Hogan and Banks will ordinarily have a density in the range of 0.940 to 0.990 gms./cc. and a melting point of approximately 250° to 260° F.

Density as used herein is determined by compression molding a slab of the polymer, cooling said molding at a temperature reduction rate of 15 to 20° F. per minute to room temperature, cutting a pea-sized specimen therefrom, and placing said specimen in a 50-ml. glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

Although frequent reference is made herein to the melting point of the thermoplastic material, the true melting point of many crystalline thermoplastic polymers, such as polyethylene, is most difficult to determine accurately.

A more readily determined physical characteristic which will quite often be synonymous (particularly with amorphous materials) with the melt point is the freeze point. For the purposes of this discussion and the definitions contained herein, the melt point will be considered as determined by the method used to determine freeze point and will for all purposes herein be considered synonymous. Crystalline freeze points are determined by melting a sample of the polymer, inserting a thermocouple into the molten polymer and allowing the molten polymer to cool slowly. The temperature is recorded and plotted vs. time. The crystalline freeze point is the first plateau in the time vs. temperature curve.

In one method of hermetically sealing thermoformed packages the package contains a flange around the lip which defines the opening in the container. The thermoplastic film is placed over the opening to enclose said opening and heat is simultaneously applied to the flange area of the container and the contacting area of the film under slight pressure so as to fuse the two component parts together. As discussed above this seal is quite effective but has the disadvantage of being most difficult to remove.

I have now discovered that if only one of the contacting surfaces is in a molten state, sufficient residual heat will remain in the molten material to fuse the second component part therewith upon subsequent immediate contact. I have further found that by the method of this invention it is possible to drastically curtail the flange on the container. Maximum benefit may be obtained from the method of this invention by the complete elimination of the flange thereby leaving only the edge of the container to be fused with the film thereby resulting in a weaker bond. The flangeless container has the added advantage of an improved storage and shipping shape.

In one embodiment, the edge or lip of the container will be molten when the film is placed in contact therewith. The surface may be heated by any convenient conventional method including a heat sealing bar, a radiant heating lamp or a gas torch. The heat should be applied to the edge for a period of time sufficient to melt at least a portion of said edge thereby forming a bead or a puddle of molten thermoplastic material. The temperature of the edge should not exceed the decomposition point of the thermoplastic material. When using polyethylene having a density of 0.940 to 0.990 gms./cc. the temperature should be in the range of 275° to 600° F., more preferably 325° to 525° F. The time of exposure will vary inversely with temperature. In the case of this high density polyethylene the time will vary from 0.1 second of 5 minutes, more preferably 5 seconds to 60 seconds. The source of heat is then removed and the film of thermoplastic material is immediately applied to said edge. The residual heat remaining in the puddle of molten material will normally be sufficient to fuse the thin film of thermoplastic material. In the case of thin films or uneven surfaces it may be desirable to use a very nominal pressure, for instance 1–20 p.s.i.g., to maintain contact of the film with the container and to insure a uniform continuous hermetic seal.

In another aspect of this embodiment I have discovered that the thermoplastic film may be heated to a temperature below the melting point of said film but above the ambient temperature to supplement the heat remaining in the bead of molten material on the container edge. This is particularly desirable when using thicker films which have exceptionally low thermal conductivity rates. It is within the scope of the invention to treat the film in any conventional manner, prior to applying to the container, e.g., by quenching the material as it comes directly from the extruder-slot-die, cold drawing and then annealing. The quenched material has a high degree of molecular orientation which is highly desirable in some forms of film. Subsequent heat treatment and drawing serves to fix the molecular orientation and reduces subsequent shrinkage. It is important, however, not to subsequently elevate the temperature above the melting point of the polymer if these properties are to be preserved. Previous treatment of the film is not important per se to the utilization of this invention. In this aspect of the invention the film is heated to a temperature above the ambient temperature and below the melting point immediately prior to engaging said film with the molten surface of the container. For polyethylene having a density of 0.940 to 0.990 gms./cc., this film may be heated to a temperature in the range of 70° F. to 250° F., more preferably 100° F. to 240° F.

In a second embodiment, the thermoplastic film is engaged with the container at a temperature above the melting point of the film and the container. The film may be heated by any conventional method to form a molten web which is immediately applied to the container. The thermal energy of the film will be sufficient to cause surface melting of the lip which defines the opening of the container and the two component parts will fuse together. Cooling of the unit will result in some shrinkage of the film to form a tight, hermetic seal that will withstand normal handling and shipping but will be easily removed by peeling. The temperature of the film can be any temperature above the melting point of the film, but in any case above the melting point of the container, preferably 25 to 150° F. above the melting point of the film. The upper limit for the temperature will be governed by the amount of "sag" which can be tolerated in the film when it is placed over the container opening. A preferred method of operation is to use the film as it emerges from the slot-die extruder. In the case of high density polyethylene the temperature of the film as it emerges from said extruder will be in the range of 300° F. to 600° F. The film is applied directly to the container and trimmed without quenching. Although this film does not have some of the properties possessed by a quenched film, it is desirable for many uses.

When using either of the above embodiments, it is within the scope of the invention to supplement the internal energy of the heated structure by externally applied heat for a period of time sufficient to insure fusion of the structures. This is particularly desirable when the container lip is at ambient temperature and a thick film (such as 250 mils) is applied at extrusion temperature due to the rather rapid conduction of the heat away from the molten film. A supply of heat to keep the film in a molten state until the container edge fuses therewith is all that is necessary. This may be particularly advantageous when it is desired to form a strong bond between the contacting surfaces.

The invention can best be illustrated by further reference to the drawings.

FIGURE 1 represents a sealed container with the film 2 partially peeled from the container 1 by the use of a tab 3.

FIGURE 2 is a cross section of FIGURE 1 illustrating the container 1 welded to the film 2 at juncture 4, with the foodstuff or other contents 18 hermetically sealed therein.

FIGURE 3 illustrates one embodiment of the invention wherein the lip 5 of the container 1 is heated to a molten state by means of the application of heat by indirect contact with a heating element 6 with the contents 18 already within the container 1. The heating element may be heated by any means but a convenient and easily controlled method is by electrical resistance with electrical energy being supplied by wires 7 through juncture box 8 into heating element 6 which converts electrical energy to thermal energy by its resistance to the passage of the electrical current. The heating element may be enclosed in any convenient carrier to prevent unnecessary dissipation of energy such as steel bars 9 which are directly connected to platform 10. This entire mechanism consisting of heating element 6, wires 7, juncture 8, bars 9 and platforms 10 is conveniently positioned onto the edges of the container 1 by rod 11 connected to platform 10 by welding on a threaded joint such as nipple 12. The rod can be connected to any convenient means for providing reciprocating motion to the entire mechanism. The heating element 6 through bar 9 must be in intimate contact with the edge 5 for a period of time sufficient to melt said edge and then the heating element is removed and the film 2 is positioned as shown in FIGURES 1 and 2 so as to enclose the opening and hermetically seal the contents therein.

FIGURE 4 represents a method of continuously producing hermetically sealed containers. Filled containers 1 are placed on a continuously moving endless belt 13 positioned by pulley 14. Mechanism 15, represented in FIGURE 3, contacts the container as shown in FIGURE 3 to melt the edge 5. Mechanism 15 necessarily must move laterally with each package to provide the necessary time of contact and then raises and returns to its original starting point to contact the next container. Film 2 is continuously supplied from roll 16 through positioning pulleys 17 to contact the molten edge of the container 1 and fuse therewith.

The following examples will further illustrate the invention. In all examples, the film and container were made from polyethylene produced by the method of Hogan and Banks with a density of 0.960 gms./cc. and a melting point of 260° F.

*Example I*

A thermoformed, substantially rectangular and flangeless polyethylene container is filled with bean salad to approximately 90 percent of its vertical dimension. A heat sealing bar having a temperature of 500° F. then engages the surface of the 50 mil thick lip defining the opening of said container for 15 seconds to melt the surface thereof. The heat sealing bar is then removed and the molten surface is immediately engaged with a 2 mil thick polyethylene film at room temperature to enclose the opening thereof. A pressure of 2 p.s.i.g. is applied to said film at the points contacting the lip for 10 seconds to permit the fused components to solidify and become integrated.

The bond between the film and container is sufficiently strong to prevent the untimely discharge of the contents during normal handling, storage and shipping but is easily removed by grasping the film and peeling the film from the container.

*Example II*

The method of Example I is used except that the film is heated by means of radiant heating to a temperature of approximately 230° F. prior to engaging the container.

Again the bond is strong enough to resist normal handling but the film may be peeled from the container by hand with slight effort.

*Example III*

A 20 mil polyethylene film is continuously extruded by a slot-die extruder at an exit temperature of 400° F. The molten film immediately engages a thermoformed container similar to that of Example I. The weight of the film is sufficient pressure to maintain contact between the film and container so as to fuse the components together.

Again the film may be easily removed by peeling, but there is sufficient adhesion to resist normal handling.

While certain examples, structures, composition and process steps have been described for purposes of illustration, the invention is not limited to these. Variation and modification within the scope of the disclosure and the claims can readily be effected by those skilled in the art.

I claim:
1. A method for joining the surfaces of a thermoplastic film and a thermoplastic container having a lip defining an opening to form a sealed container which comprises applying heat to melt at least a portion of a contacting surface of said lip without applying heat to said film, discontinuing the application of heat, immediately engaging said molten portion in intimate contact with the film while said surface is molten to enclose the opening of said container thereby fusing with said continer and cooling the fused surfaces to cause solidification and integration thereof.

2. The method of claim 1 wherein said thermoplastic film and said thermoplastic container are manufactured from polyethylene having a density of 0.940 to 0.990 gms./cc. and a melting point of about 250° to 260° F.

3. The method of claim 1 wherein the temperature of said film is above the ambient temperature and below the melting point of said film.

4. A method for heat sealing a polyethylene container having a lip defining an opening with a polyethylene film to form a hermetically sealed container, said polyethylene having a density of 0.940 and 0.990 gms./cc. and a melting point of about 260° F., which comprises applying heat to at least a portion of the contacting surface of said lip without applying heat to said film to elevate the temperature thereof to a range of 275° F. to 600° F. for a period of time ranging from 0.1 second to 5 minutes to melt said portion, immediately engaging said molten portion in intimate contact with the film while said portion is molten to enclose the opening of said container thereby fusing with said container and cooling the fused surfaces to cause solidification and integration thereof.

5. The method of claim 4 wherein the temperature of said film is in the range 70° F. to 250° F.

References Cited in the file of this patent
UNITED STATES PATENTS

| | | |
|---|---|---|
| 2,210,509 | Strauch | Aug. 6, 1940 |
| 2,549,123 | Osterhof | Aug. 17, 1951 |
| 2,649,392 | Marshall | Aug. 18, 1953 |
| 2,690,593 | Abercrombie | Oct. 5, 1954 |
| 2,736,656 | Marshall | Feb. 28, 1956 |
| 2,760,551 | Downey et al. | Aug. 28, 1956 |
| 2,875,563 | Moore | Mar. 3, 1959 |
| 2,878,154 | Cheney et al. | Mar. 17, 1959 |
| 2,908,601 | Brown | Oct. 13, 1959 |
| 2,937,481 | Palmer | May 24, 1960 |
| 2,957,793 | Dickey | Oct. 25, 1960 |
| 3,006,800 | Lasker et al. | Oct. 31, 1961 |
| 3,035,958 | Wilkins | May 22, 1962 |

FOREIGN PATENTS

| | | |
|---|---|---|
| 42,019 | Sweden | Oct. 12, 1915 |